Figure 1:
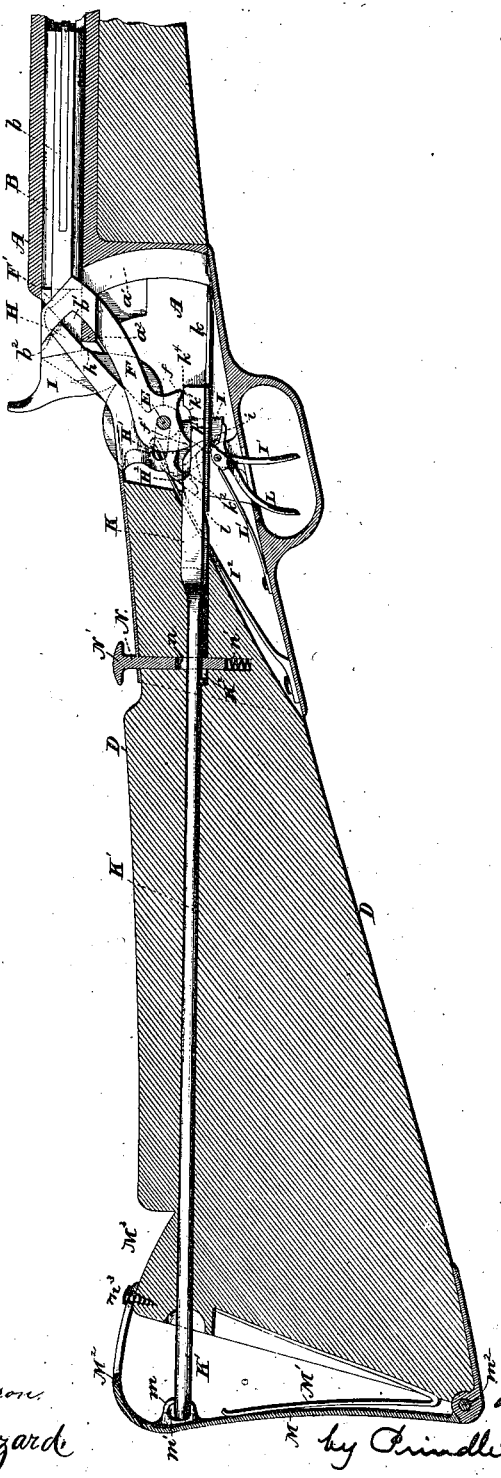

(No Model.) 7 Sheets—Sheet 1.

W. W. KIMBALL.
RECOIL OPERATED BOLT GUN.

No. 554,068. Patented Feb. 4, 1896.

Witnesses
Chas. J. Williamson
Henry C. Hazard

Inventor
Wm. W. Kimball,
by Prindle and Russell, his
Attorneys (No Model.)  W. W. KIMBALL.  7 Sheets—Sheet 2.
RECOIL OPERATED BOLT GUN.
No. 554,068.  Patented Feb. 4, 1896.
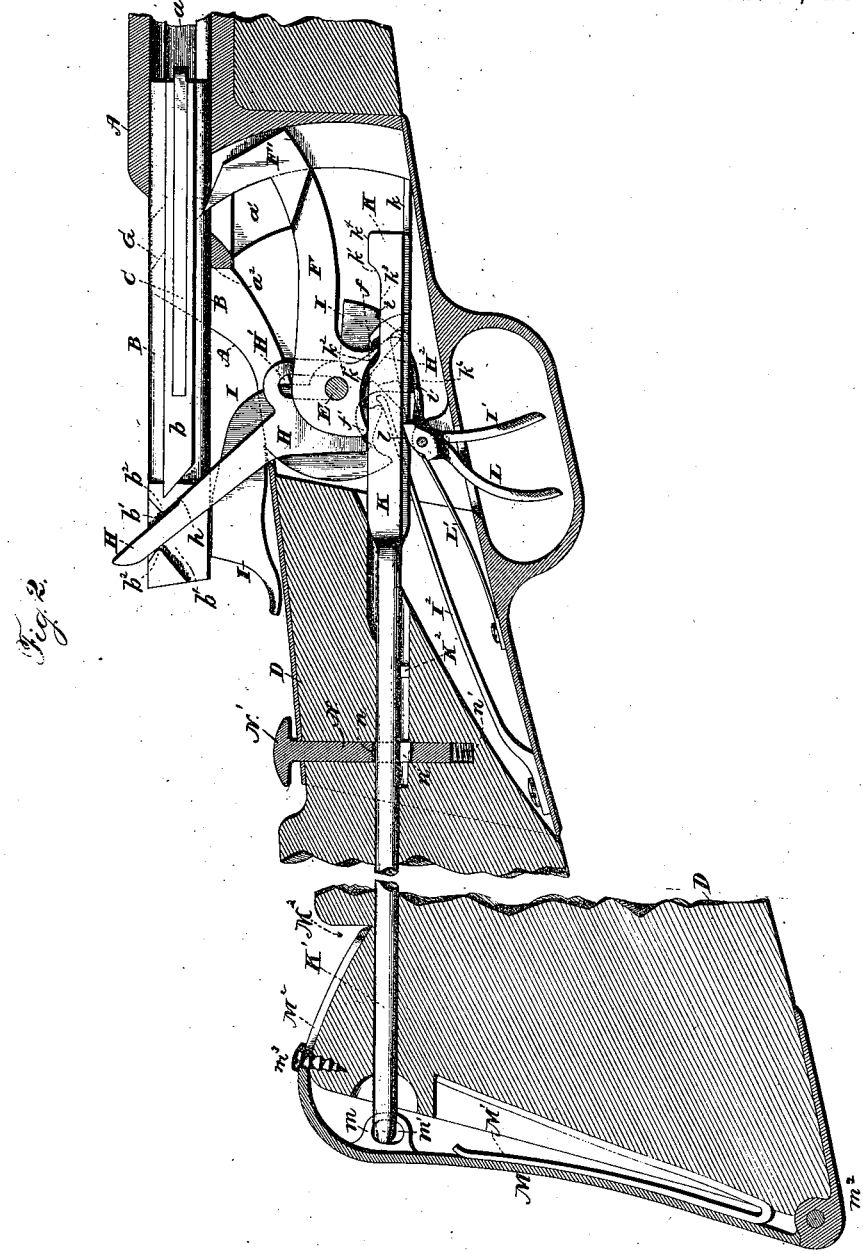

(No Model.)
7 Sheets—Sheet 3.
W. W. KIMBALL.
RECOIL OPERATED BOLT GUN.
No. 554,068. Patented Feb. 4, 1896.
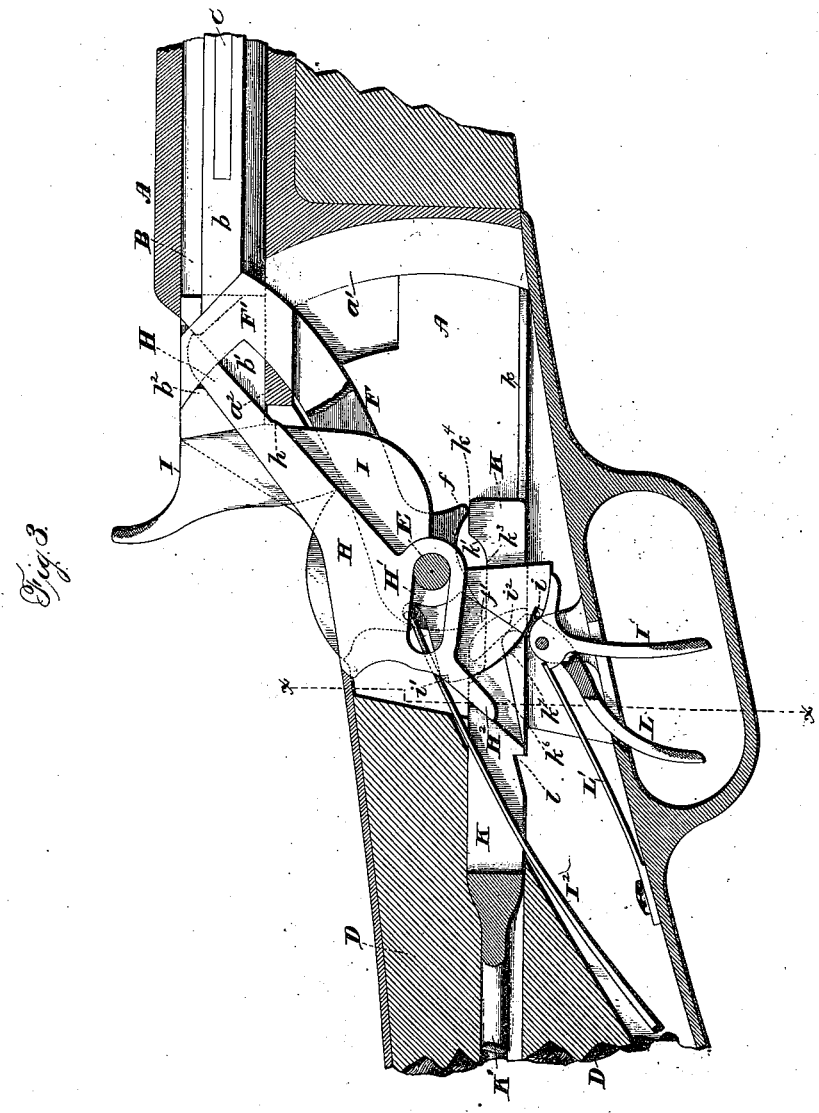
Witnesses
Chas. Williamson.
Henry C. Hazard.
Inventor
Wm. W. Kimball, by
Chindle and Russell, his Attys (No Model.)
W. W. KIMBALL.
RECOIL OPERATED BOLT GUN.
No. 554,068. Patented Feb. 4, 1896.
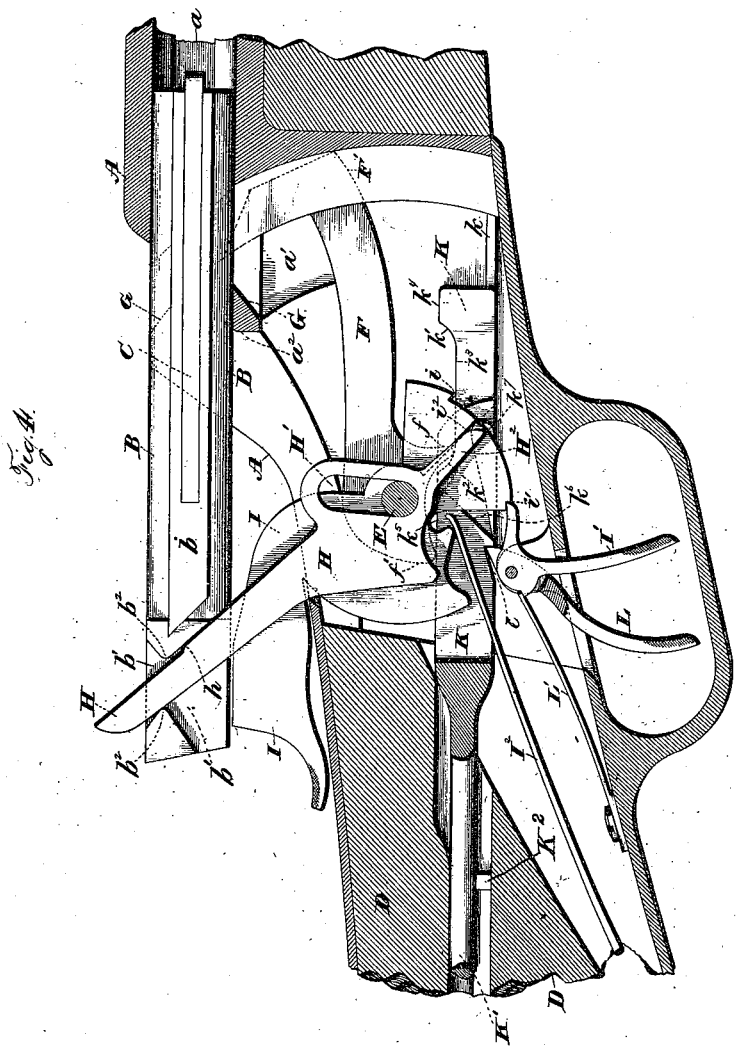

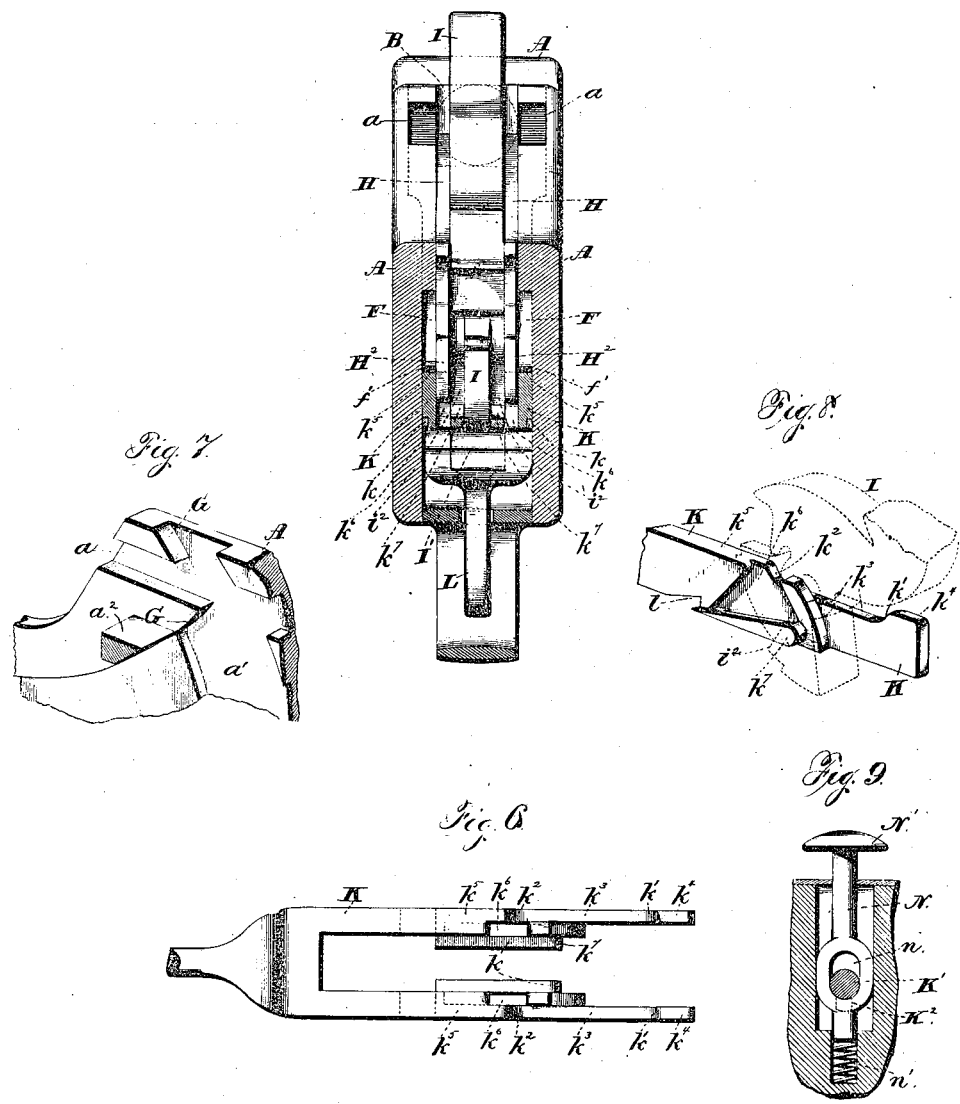

(No Model.) 7 Sheets—Sheet 6.
W. W. KIMBALL.
RECOIL OPERATED BOLT GUN.
No. 554,068. Patented Feb. 4, 1896.
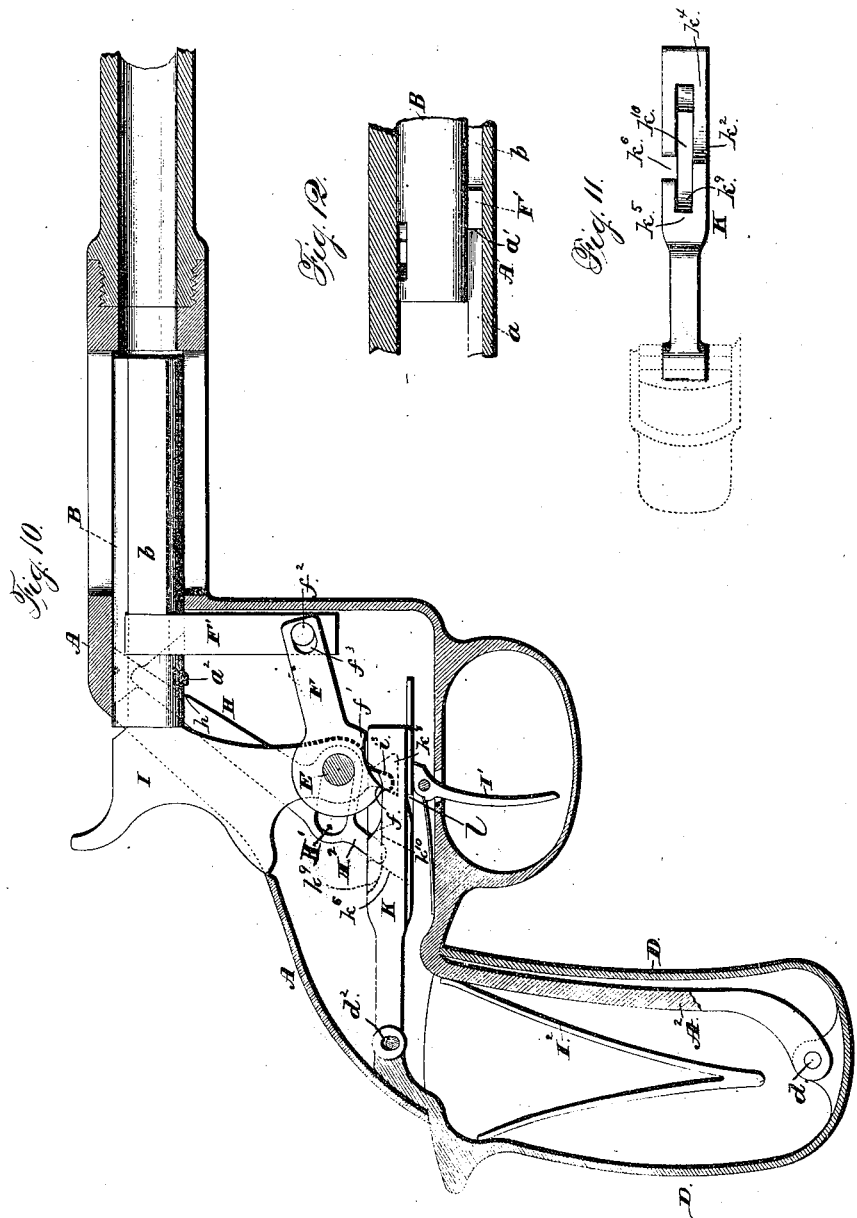
Witnesses:
Chas. J. Williamso
Henry C. Haz.
Inventor
Wm. W. Kimball, by
Dindle and Russell, his Attys (No Model.) 7 Sheets—Sheet 7.
W. W. KIMBALL.
RECOIL OPERATED BOLT GUN.
No. 554,068. Patented Feb. 4, 1896.
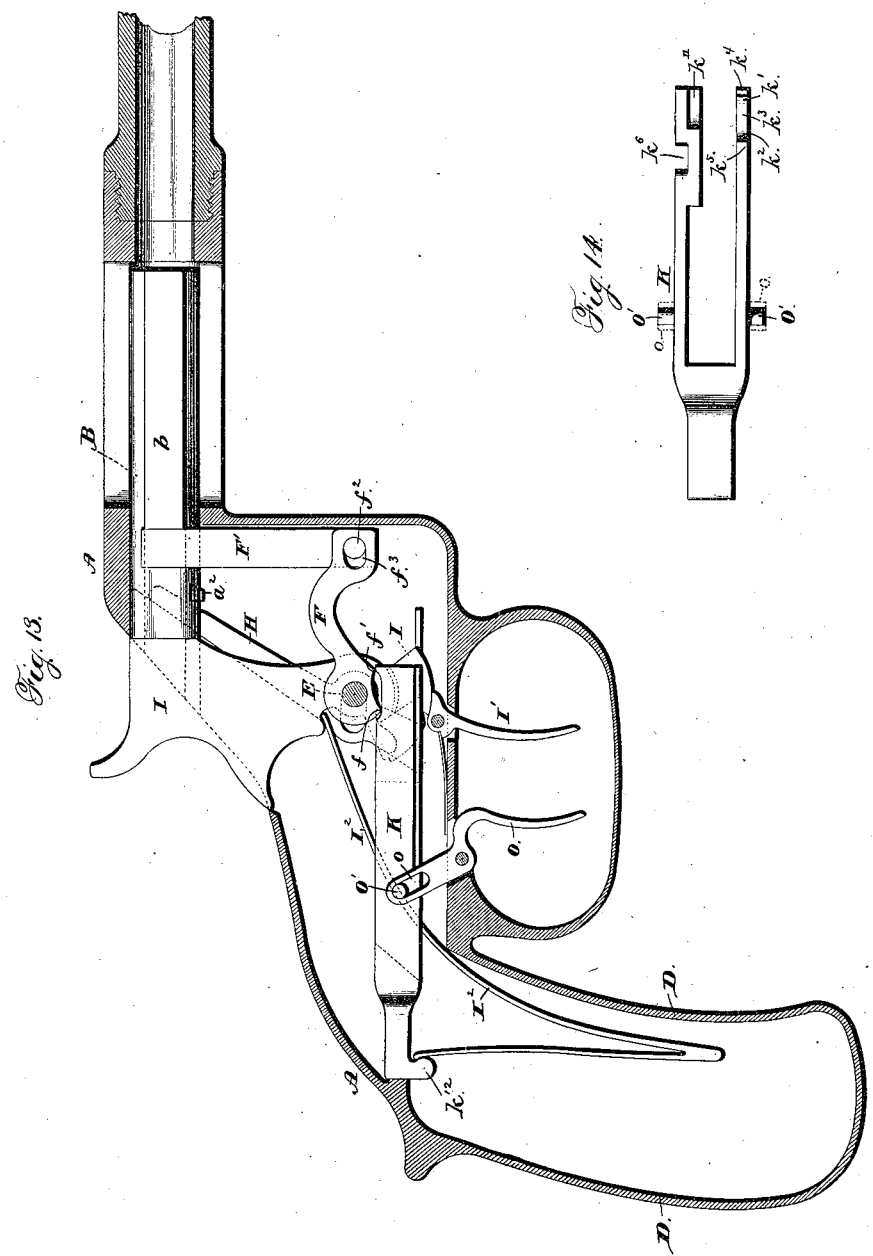
Witnesses
Chas. J. Williamson
Henry C. Hazard
Inventor
Wm. W. Kimball, by
Brindle and Russell, his Attys

UNITED STATES PATENT OFFICE.

WILLIAM W. KIMBALL, OF WASHINGTON, DISTRICT OF COLUMBIA.

RECOIL-OPERATED BOLT-GUN.

SPECIFICATION forming part of Letters Patent No. 554,068, dated February 4, 1896.

Application filed July 28, 1887. Renewed July 5, 1895. Serial No. 555,025. (No model.)

*To all whom it may concern:*

Be it known that I, WILLIAM W. KIMBALL, of Washington city, in the District of Columbia, have invented certain new and useful Improvements in Firearms; and I do hereby declare that the following is a full, clear, and exact description thereof, reference being had to the accompanying drawings, in which—

Figure 1 shows a longitudinal sectional view of the breech portion and stock of a shoulder-piece provided with my improved breech mechanism, such mechanism and its operating devices being shown in elevation; Fig. 2, a similar view, enlarged, showing the parts of the breech mechanism and its operating devices in position when the breech is open; Fig. 3, a detail enlarged view, showing the parts of the breech mechanism in position when the breech is closed, a portion of the operating devices being broken away; Fig. 4, a similar view showing the parts as when the breech is open; Fig. 5, a sectional view on line $x\ x$ of Fig. 3; Fig. 6, a detail plan view of the "pusher" with its cams; Fig. 7, a detail perspective view showing the groove in the receiver side in which the bolt-locking portion of the locking-lever moves, and the recoil-surface to engage such portion; Fig. 8, a detail perspective view of one of the sides of the pusher, showing the form of the cams thereon; Fig. 9, a detail view of the lock for the pusher; Fig. 10, a longitudinal sectional view of a pistol with my invention applied thereto; Fig. 11, a detail plan view of the pusher or cam-piece used with the mechanism shown in Fig. 10; Fig. 12, a detail sectional view showing the locking-bolt and the way in which it is supported and locks the breech bolt or block; Fig. 13, a longitudinal sectional view of a pistol provided with my breech mechanism and the actuating-pusher with another form of means for moving the pusher, and Fig. 14 a detail plan view of the forward portion of the pusher with its cams.

Letters of like name and kind refer to like parts in each of the figures.

The object of my invention is to provide certain improvements in breech-loading firearms; and to this end my invention consists in the mechanism and in the construction, arrangement and combination of parts thereof, as hereinafter specified.

Such mechanism as will appear from the drawings and the description hereinafter given is, while simple in construction and action, adaptable for use in a large variety of military and other firearms. It can be used to great advantage not only in single-loading and magazine or repeating guns and pistols, but also in machine-guns.

When my invention is applied to a gun or pistol having a magazine and means for feeding the cartridges as desired, such gun or pistol can be either adapted to fire automatically and continuously as long as required or until the cartridges in the magazine are exhausted, or it can be used as a single-loader or as an ordinary magazine-arm to be fired by a pull on the trigger.

The change in the use of such a gun or pistol from a single-loader to a repeater or machine-gun does not involve any change in or adjustment of the parts of the breech mechanism, and can be made instantly, as will appear and be set forth hereinafter.

In the drawings, A designates the receiver, and B the reciprocating breech bolt or block inclosed and guided in a suitably-shaped channel or passage through the upper portion of the receiver. In the present case this bolt is shown as cylindrical, with longitudinal ribs $b\ b$, guided and sliding in corresponding grooves $a\ a$ at the sides of the bolt channel or passage. The bolt can, however, be varied in shape, as desired, and can be guided and held in place in the receiver in any other suitable way.

No firing pin or rod is shown, as any desired form or construction of such device can be used, as will be obvious to those familiar with the art of making breech-loading firearms.

C designates the extractor, which can also be of any of the well-known forms and placed at any desirable location on the bolt.

Although the barrel is not shown in the drawings of the shoulder-piece, it will be understood that it is to be screwed or otherwise fastened to the forward portion of the receiver in line with bolt B, as shown in the drawings of the pistols, Figs. 10 and 13.

The receiver is continued rearward to form the grip of the piece, and the stock D is secured in the rearward portion of the receiver in any desired way.

A single pin E, extending transversely across the receiver-chamber, serves to support the various operative parts of the breech mechanism. Upon this pin are pivoted, at the opposite sides of said chamber, the two bolt-locks F F, each consisting of a lever-arm pivoted near its rear end on the pin and bearing on its other end the locking-brace or bolt-locking block F', made thicker than the lever-arm.

The receiver is, at the forward end of its chamber, provided with the grooves $a'$ $a'$, adapted to allow the locking-blocks F' F' to rise and fall freely as the bolt-lock levers are swung up and down.

The ribs $b$ $b$ on the bolt B are at their rear ends cut away, so as to allow the blocks F' F' to swing up behind and in contact with them when the bolt is forward closing the breech.

The forward faces of blocks F' F' are cut away on a straight line, inclined upward and rearward at a slight angle, as shown, and not on an arc from the pivot-pin E as a center.

The abutting ends of the ribs $b$ $b$ are correspondingly shaped so as to fit squarely against the inclined forward faces of the blocks when the bolt B is forward closing the breech and the bolt-locks are up in locking position. With the faces of the blocks thus inclined upward and inward at an angle to the tangents to the curves which the blocks describe as they are swung up and down such faces will, obviously, move away from the inclined abutting faces on the rib ends as the blocks are swung down to unlock the bolt.

With this construction, then, there is no danger of the locking-blocks sticking against the ends of the ribs when the bolt is to be unlocked.

It is not intended that any of the recoil or backward thrust on the breech-block shall be supported or taken up by the lever-arms of the bolt-locks or by the pivot-pin E; but that it should all be taken by the curved abutments G G on the receiver at the rear sides of the upper portions of the grooves $a'$ $a'$. Such abutments, engaging as they do the curved rear sides of the bolt-locking blocks F' F', afford recoil-surfaces to support the blocks in the most efficient manner against any rearward or downward pressure by the inclined ends of ribs $b$ $b$ upon the forward faces of the blocks.

It is intended to provide for sufficient play or lost motion of the bolt-lock lever-arms upon the pivot-pin E, or enough spring of the lever-arms themselves, so that the recoil blocks or abutments G G shall take up all of the recoil, and none of it shall be transmitted to the pin.

With the upper curved recoil-surfaces on the abutments G G running upward and rearward, as shown, and with the blocks F' F' having the curved surfaces at their rear side fitting against such recoil-surfaces, any possible rearward thrust of the rib ends on the breech-bolt will be taken up safely by the recoil-surfaces without any danger of forcing the blocks F' F' downward.

On the lower side of the pivotal portion of each of the locking-lever arms below and respectively in front and to the rear of the pivot-pin E are the two downwardly-extending cam projections or lugs $f f'$. Also pivoted upon pin E on opposite sides of its middle point and close beside the locking-lever arms are the two bolt-actuating levers H H, which I term "throwers." When the bolt is forward in position to close the breech of the firearm the upper portion of these throwers extend forward and upward into sockets $b'$ $b'$ in the opposite sides of the rear portion of the bolt B. Each of these sockets is made flaring downward and upward, as shown, so as to leave the angular abutments $b^2$ $b^2$ at its forward and rear sides to be engaged by the thrower-lever in its movements.

The angular abutments being arranged with their angles toward each other, the thrower-levers are free to rise and fall and swing or rock a certain distance with reference to the bolt, as indicated clearly in the drawings, (see Figs. 3 and 4;) but the forward or back swinging of the levers upon the pin E as a center will throw the bolt positively forward or back. Each of these levers is provided with a slot H', engaged by the pivot-pin, such slot being so arranged as to have its front end in engagement with the pin when the breech-bolt is closed and the lever is swung forward. From the pivot-pin the slot has then a slight upward inclination to the rear. On each of the levers also, and extending downward and rearward from the heel thereof, is a lug or rigid arm $H^2$, and on the forward side of each lever, near its upper end, is an inclined shoulder $h$, adapted to engage the portion $a^2$ of the receiver when the lever is shoved forward, as and for the purpose hereinafter set forth.

Pivoted on the pin E, between the two throwers, is the hammer I, which can of course be of any desired shape or construction. The hammer-cam is provided with the usual half-cock or safety and full-cock notches $i$ and $i'$, respectively, adapted to be engaged in the ordinary way by the trigger I' or by a sear actuated by a trigger.

The hammer is preferably made of such thickness as to fill the space between the two bolt-throwing levers, as indicated clearly in Fig. 5. The rear portion of the hammer-cam is cut away on both sides, so as to leave the radially-extending shoulders $i^2$ $i^2$ for a purpose to be described hereinafter.

The mainspring $I^2$ can be of any of the ordinary forms or constructions engaging a suitable notch or shoulder on the rear side of the hammer-cam in the well-known way.

For actuating the various parts of my mechanism, as described, so as to unlock the breech-bolt, throw the same back to open the breech, cock the hammer, throw the bolt forward again and lock the same in position to close the breech, I have provided the reciprocating cam-carrying piece K, which I term the "pusher." This piece, which reciprocates below the pivot-pin E, is guided on the ribs or ways $k$ $k$ on the inner sides of the receiver-walls. It is forked to inclose or extend forward on opposite sides of the hammer-cam, and its sides or fork-arms are provided with corresponding and similar means for actuating the duplicate parts of the breech mechanism and the hammer.

The devices on the pusher for actuating the corresponding parts of the breech mechanism are arranged precisely alike, so that such corresponding parts shall be actuated always together.

For actuating the two bolt-locking levers each of the fork-arms of the pusher is provided with the two oppositely-inclined cams $k'$ $k^2$, having their lower portions connected by a straight surface $k^3$ parallel with the plane of movement of the pusher. From the top of the forward one of these cams, which is inclined upward and forward, there extends a short plane surface $k^4$ in a plane parallel to that of the plane surface $k^3$. Extending rearward from the top of the other cam $k^2$ is the plane or straight surface $k^5$ in the same plane with the elevated surface $k^4$. These cams and surfaces are directly below the pivotal portions of the bolt-locking levers, and are brought into engagement with the cam-lugs $f$ $f'$ on such levers as the pusher is moved forward and back on its guides in the receiver-chamber.

With the pusher in its rearward position, as shown in Figs. 1 and 3, the forward cam-lugs, $f f$, on the two locking-levers rest on the forward raised plane surfaces, $k^4$ $k^4$, on the pusher-forks, while the rear lugs, $f'' f'$, rest on the lower plane surfaces, $k^3$ $k^3$, between the cams $k'$ $k^2$. The locking-levers will thus be held securely in their elevated positions with the bolt-locking blocks engaging the rear ends of ribs $b$ $b$ on the bolt, and locking the latter, as described hereinbefore.

As the pusher is moved forward, the raised plane surfaces $k^4$ $k^4$ will slide under the forward cam-lugs on the levers for a time, the lower plane faces, $k^3$ $k^3$, meanwhile passing under the rear cam-lugs, $f'' f'$. During this portion of the movement of the pusher the locking-levers will then, obviously, be kept in their elevated bolt-locking positions. Upon continued movement of the pusher the raised surfaces $k^4$ $k^4$ pass from under the forward cam lugs or projections on the levers, leaving such levers free to be swung down to unlock the bolt. After said surfaces $k^4$ $k^4$ have passed from under and beyond the said forward lugs on the levers, the cams or inclines $k^2$ $k^2$ come in contact with the rear lugs or cam projections, $f'$ $f'$, on the levers and force them upward, so as to swing the levers downward into the position shown in Figs. 2 and 4, unlocking the bolts. The forward cam-lugs, $f f$, then rest on the lower plane surfaces, $k^3$ $k^3$, while the rear lugs, $f'' f'$, rest on the rear upper or raised plane surfaces, $k^5$ $k^5$, and the levers are locked in their depressed positions.

During the further continued forward movement of the pusher the levers will now remain unmoved, for the upper and lower parallel plane surfaces will slide under and in contact with the rear and forward lugs $f'' f'$ and $f f$, respectively.

The lower or depressed plane surfaces, $k^3 k^3$, on the pusher-fork arms are of such length with reference to the distances between the forward and rear lugs on the locking-levers that as the rear lugs are engaged by and ride up over the rear cams, $k^2$ $k^2$, the front lugs ride down over the front cams, $k'$ $k'$. After the levers have been rocked down and the rear upper and lower parallel surfaces on the pusher are in engagement with the rear and forward lugs, $f'' f'$ and $f f$, respectively, the pusher can continue to move forward without moving the locking-levers, which remain locked in their lowered positions, leaving the bolt B unlocked and free to be slid back by the bolt-actuating levers H H, so as to open the breech. In each of the fork-arms of the pusher is a slot $k^6$ made flaring downward, as shown, (see Figs. 3, 6, and 8,) into which projects the arm H² on the respective bolt-actuating lever H, supported, as described hereinbefore, above the fork-arm on the pivot-pin E. With this construction, as the pusher K moves to actuate the locking-levers, as described above, the rear ends of the slots $k^6 k^6$, engaging the arms H² H², move the lower portions of the levers H H bodily forward on the pin E, such movement being allowed for by the slots H' H' engaging the pin.

As the bolt-locking levers are swung down by the action of the cams on the pusher, the bolt-throwing levers or throwers H H are moved forward so that the cam-shoulders $h$ $h$ thereon strike the solid abutment or piece $a^2$ on the receiver. Further forward movement of the lower portions of the throwers will then, obviously, cause a prying action to force the bolt backward.

The power exerted upon the lower portions of the throwers has now the advantage of great leverage, so that the bolt will be easily started back even if a cartridge-shell whose flange is engaged by the extractor tends to stick in the chamber of the barrel. The bolt being thus loosened and started back, continued movement of the pusher and the lower portions of the throwers brings the rear ends of slots H' H' against the pin E.

The pivotal point of each of the levers is now this pin, and the arms H² H² being quite short with relation to the portions of the levers above the pin, the loosened bolt will obviously be thrown with a quick movement back to its rearward limit, as shown in Figs. 2 and 4, withdrawing the cartridge-shell clear of the barrel so that it can be thrown out or ejected by any desired ejecting device.

On the inner sides of the two fork-arms on the pusher are the corresponding cams $k^7 k^7$, adapted to engage the shoulders $i^2 i^2$ on the sides of the hammer-cam. They are so situated that before the pusher has started on its forward movement to actuate the various parts of the breech mechanism, as described above, their forward ends are immediately in the rear of the shoulders $i^2$ $i^2$ when the hammer is forward and not cocked or swung back. (See Fig. 3.) With this construction as soon as the pusher begins to move forward the hammer will begin to be cammed or swung back, and before the bolt is thrown quickly back by the throwers said hammer will be swung far enough so that the bolt and cam pass easily rearward over its face.

As the pusher reaches the limit of its forward movement in swinging the bolt-thrower levers back, the cams $k^7$ $k^7$, engaging the shoulders $i^2$ $i^2$, cock the hammer sufficiently to allow the full-cock notch $i'$ to be properly engaged by the nose of trigger I' or by a sear provided therefor. In order to lock the pusher in its forward position when desired—as, for instance, when the gun is used as a single-loader and a cartridge is to be supplied to the gun by hand—I have provided the trigger L, pivoted on the same pin with the hammer-trigger. This trigger L is forked at its pivotal portion to embrace trigger I' and extends at each side out below the fork-arms of the pusher, which on their lower sides are provided with the corresponding notches $l$ $l$, adapted to be engaged at the same time by the extended nose or edge of the trigger.

A trigger-spring L' normally holds the trigger-nose pressed against the lower sides of the pusher-fork arms in position to engage the notches when they are brought over the trigger by the forward movement of the pusher. If the trigger L be held or moved out of engagement with the notches $l$ $l$ on the pusher and the latter be moved back from its forward position, (shown in Figs. 2 and 4,) the forward sides or ends of the slots $k^6$ $k^6$ on the fork-arms engage the arms $H^2$ $H^2$ on the bolt-throwing levers and move them backward. As the slots H' H' in the thrower-levers are now substantially at right angles to the line of motion of the pusher, the first movement of the levers is about the pivot-pin E as the center, and the long upper arms of the levers have, consequently, a quick forward throw, sending the bolt forward to drive the cartridge into the barrel and close the breech. Upon continued movement of the pusher the thrower-levers, having been swung forward so as to bring the slots H' H' down substantially parallel with the line of movement of the pusher, are moved bodily rearward into the position shown in Figs. 1 and 3. The hammer is retained in cocked position by the trigger I' in the usual way. During the movement of the pusher, which causes, as described above, the thrower-levers to swing and throw the breech-block forward, the upper and lower surfaces, $k^5$ $k^5$ and $k^3$ $k^3$, are passing rearward under and in contact with the lugs $f'$ $f'$ and $f$ $f$, respectively, on the locking-levers. The latter levers are thus held in their lowered positions until the thrower-levers have thrown the bolt B forward. The rear cams, $k^2$ $k^2$, then come below the rear lugs, $f'$ $f'$, which ride down over them, while the forward cams, $k'$ $k'$, engage the forward lugs, $f$ $f$, and force them upward, thereby swinging the levers upward to bring the locking-blocks thereon up in contact with the inclined surfaces at the rear ends of ribs $b$ $b$ on the breech-bolt and the curved recoil-surfaces on the recoil blocks or abutments G G.

The pusher is adapted to have a short continued motion after the cam-lugs $f$ $f$ have ridden up over cams $k'$ $k'$, so as to bring the forward portions of the raised plane surfaces under the lugs. The desired preliminary forward movement of the pusher without movement of the locking-levers, described hereinbefore, is thus provided for.

As the locking-levers are thrown up to lock the bolt, the inclined surfaces on the forward sides of the locking-blocks F' F engage the inclined surfaces on the rear ends of ribs $b$ $b$ on the bolt, and will force the bolt forward to close the breech tightly if it has not been thrown quite far enough by the thrower-levers. The piece can now be fired by pulling the trigger I' to cause it to release the hammer, which is pressed forward by the mainspring.

As all the operative parts of the breech mechanism are actuated from the movement of a single piece (the pusher) their relative movements must always take place in the same order, and there is no possibility of any part being moved at the wrong time or in the wrong direction. The locking-levers cannot swing down until there has been a certain predetermined amount of movement of the pusher, and the bolt-throwing levers cannot operate to loosen the bolt and cartridge-shell and throw both back until the locking-blocks on the locking-levers have been disengaged from the ribs $b$ $b$ on the bolt B, and have left the grooves $a$ $a$ open toward the rear for the ribs $b$ $b$ to slide backward with the bolt B.

With the cams $k^7$ $k^7$ on the pusher in position to engage the shoulders on the hammer-cam when the first movement of the pusher takes place, not only will the hammer be retracted a certain distance during the preliminary or first movement of the pusher before the locking-levers are moved at all to lock the bolt, but the hammer cannot descend the full distance to strike the firing-pin in the bolt B until the pusher is at its extreme front position and the locking-levers are consequently up in position to securely lock the bolt with the locking-blocks F' F'. It is then, with my mechanism, absolutely impossible to fire the piece while the parts of the breech mechanism are in a dangerous position, or while the bolt is unlocked.

The reciprocating cam-piece, or "pusher," as I term it, can be operated or actuated in any desired way and by any desirable means. Cranks, levers, or cams can be used for this purpose either alone or supplemented by springs.

I have described the pusher as being moved forward and back with reference to the breech mechanism; but, obviously, the result and action will be the same if the pusher is stationary and the said mechanism moves back and forward with reference to it.

In Figs. 1 to 9, inclusive, of the drawings I show my invention as applied to shoulder-guns so that the breech mechanism will be actuated by the recoil of the gun, while in Figs. 10 to 12, inclusive, I show it as applied in substantially the same way to a pistol.

In the gun shown in Figs. 1 to 9 the pusher is provided with a rearwardly-extending rod or tang K', which passes through a longitudinal passage in the stock in a direction substantially parallel with the barrel and breech-bolt of the gun. Pivoted to the toe of the stock is the movable butt-plate M having near its heel end the lug $m$ provided with a slot $m'$ engaging the bent end of or a lug on the rod K'. The end of the stock is cut away at an angle from the toe to the heel, so as to leave room for swinging of the butt-plate on its pivot or hinge $m^2$. A spring M', which can be of any desired shape, but is, preferably, as shown, of the well-known V form, presses the plate rearward or outward, so as to hold it normally in the same position with relation to the stock as an ordinary fixed butt-plate. To cover the space between this swinging plate and the butt-end when the plate is swung outward, I prefer to provide the plate with cheek-pieces or flanges to lap over the edges or sides of the cut-away end of the stock, and also with the portion $M^2$ extending and sliding over the heel of the stock.

To allow for the forward swinging of the hinged butt-plate, I show a notch $M^3$ made in the stock near its heel, into which the forwardly-extending portion $M^2$ on the plate can slide as the plate swings on its hinge. Said portion $M^2$ is preferably slotted, as shown at $M^2$, and a pin or screw $m^3$ passing through the slot and into the stock serves to steady and guide the free end of the butt-plate in its movements.

Where, as I contemplate, instead of a hinged butt-plate, one is used which will slide or move directly toward or from the butt or stock end with a reciprocating movement, of course no notch or cut in the rear or upper side of the stock need be made. The plate can then be guided in its rectilineal movements by dowel-pins or other guiding means.

The operation of my mechanism in the shoulder-arm, as described, is briefly as follows: With a cartridge in the gun and the butt-plate M resting against the shoulder of the one firing the gun or against any stationary abutment, if the trigger I' is pulled to let the hammer fly forward and fire the cartridge the recoil of the gun, which takes place as the bullet leaves the muzzle, will move the whole piece bodily to the rear. As the plate M cannot move, the pusher K with its tang connected to the plate, as described, will remain stationary while the gun and its breech mechanism move bodily backward with reference to it and its various cams. As the gun moves rearward and the butt-plate is stationary, the spring M' will, obviously, be compressed and will store up power to be used as hereinafter set forth. Said spring will, also, in taking up the recoil of the gun prevent any shock coming upon the shoulder of one firing the piece. As the gun moves rearward under the recoil, the forward lugs, $f f$, on the locking-levers pass off of the elevated plane surfaces $k^4 k^4$ and down over cams $k' k'$, while the rear lugs, $f' f'$, engage and ride up over cams $k^2 k^2$, so that the levers are swung down to disengage the locking-blocks F' F' from the ends of ribs $b\ b$ on the breech-bolt. Meanwhile the hammer is being cammed back by the engagement of the shoulders $i^2 i^2$ thereon with the cams $k^7 k^7$, and the thrower-levers H H are held from moving back by the engagement of their arms $H^3 H^2$ with the slots $k^6 k^6$ in the pusher arms or forks. Continued movement of the gun to the rear then causes the shoulders $h\ h$ on the respective levers to engage the abutment $a^2$ on the receiver, so as to pry the breech-block loose and start it back, as hereinbefore described. The pivot-pin E then moving rearward, strikes the rear ends of slots H' H' in the thrower-levers, and causes such levers to swing rapidly rearward around the pin as a center and throw the bolt B quickly back into its fully-open position.

As a certain amount of preliminary backward motion of the gun is necessary in order to carry the forward lugs, $f f$, on the locking-levers off of the forward elevated plane surfaces, $k^4 k^4$, on the pusher, there can be no danger that the "jump" of the gun, or the shock or jar which takes place before the projectile leaves the muzzle, will cause the breech-bolt to be unlocked. Only after a certain amount of direct backward movement of the piece caused by the recoil proper can the unlocking of the bolt take place.

When after firing the piece the parts of the mechanism have been brought into the open-breech position by the recoil, as stated above, and the spring M' is compressed and under tension, the trigger L catching the notches in the pusher holds the same in the position into which it has been brought with relation to the various parts of the breech mechanism. A cartridge having been put in position in front of the bolt end, so as to enter the chamber in the barrel, if the trigger L be pulled the spring M' throws the plate M and the pusher rearward, causing the cartridge to be pushed by the bolt into the barrel and the bolt to be locked in the manner fully described hereinbefore. If the trigger L be held out of engagement with the pusher, the breech mechanism will, by the recoil of the gun on firing, be opened and then automatically closed again immediately by the action of the spring M'.

If the gun is provided with a suitable magazine, it can be used as a very rapidly-firing repeater, for then with the trigger L pressed back the breech mechanism will be automatically opened, the old cartridge-shell thrown out, a new cartridge put in place in front of the breech-bolt and the breech closed and locked, putting the gun in readiness for firing by pulling the trigger I' to release the hammer.

With a proper magazine and feeding mechanism therefor, if both triggers L and I' be pressed back out of operative position the loading and firing of the gun will go on continuously until the cartridges in the magazine are exhausted, for as the breech-bolt is thrown forward by the action of spring M upon the breech mechanism, as described hereinbefore, the hammer will travel forward behind the bolt and will strike the firing-pin so as to fire the cartridge after the bolt is closed and locked.

While the cams $k^7 k^7$ on the pusher by their engagement with the shoulders $i^2 i^2$ on the hammer-cam prevent the hammer from striking the firing-pin before the breech is closed and locked, they do not prevent the hammer from delivering a firing-blow on the pin after the closing of the breech, as the distance from the pivot-pin to the point of engagement of the cam $k^7$ with the shoulder on the hammer-cam is much less than the distance from the pin to the striking part of the hammer-arm.

With my breech-mechanism-actuating devices as described the recoil of the gun upon firing obviously acts upon both the main-spring and the spring M to put both under tension, and both springs act together to take up the recoil.

With the hammer cocked and held by the trigger I' and the breech closed the stress of spring M needs only to be overcome if the breech is to be opened without or before firing the gun.

To lock the pusher K against movement when the gun is not being fired I provide the pusher-tang K' with the lug $K^2$, adapted to be engaged by the latch or bolt N when the pusher is at its extreme rearward position. (Shown in Fig. 1.) Such bolt passes down through the upper portion of the grip of the stock in such position that the hand in gripping the stock will engage and press downward the head N' on its upper end. The main portion of the bolt or latch is slotted at $n$ to embrace the pusher-tang, the part of the bolt at the lower end of the slot being the part which engages the lug $K^2$. A spring $n'$, situated in a suitable recess below the end of the bolt, acts to throw the bolt upward into position to engage the lug when the head N' is not pressed down. The latch or bolt engaging the lug on the pusher-tang holds the pusher securely from movement during any handling of the piece, even when the latter is brought to "order arms" with the butt-plate on the ground.

When the gun is brought into position for firing, the pusher will be unlocked without any thought or care on the matter being necessary on the part of the one using the piece, for in the very act of gripping the stock, so as to put his finger on the trigger, he depresses the pusher lock or latch, causing it to disengage lug $K^2$.

I do not limit myself to the form or construction of the pusher-lock shown and described, though I prefer that form. Other swinging or reciprocating devices for the same purpose may be used as desired.

The slots H' H' in the main or pivotal portions of the bolt-thrower levers H H are, as shown, not quite horizontal or parallel with the pusher K when the throwers are forward and the breech closed, but are inclined slightly upward from their front ends. This is to prevent binding on the pivot-pin E when the throwers have been moved by the pusher, so as to bring their shoulders $h\,h$ against abutment $a^2$, and are caused to move or swing about such shoulders as pivotal points or fulcra.

The slots can, if desired, be slightly curved for the same purpose.

In Figs. 10, 11, and 12 of the drawings I show a pistol provided with recoil-actuated breech mechanism operating upon the same principle as the mechanism already shown and described in connection with a gun.

Some of the details of construction are slightly altered; but the mechanism operates in the same way.

Instead of having the bolt-locking blocks on the swinging levers, I prefer to have a single sliding block or lock F' reciprocating in guides at right angles to the rib $b$ on the side of the breech-bolt.

A vertical groove $a'$ in the receiver side serves to guide and hold said sliding lock against rearward movement, the rear side of the groove being the recoil-surface. For actuating this lock proper I provide the lever F, pivoted on the pivot-pin E in the same way as the bolt-locking levers described hereinbefore and shown in the gun mechanism. This lever is connected with the bolt-lock F' by a pin $f^2$ on the latter engaging a slot $f^3$ in the lever. On the pivotal portion of the lever are the same cam-lugs $f$ and $f'$ as are on the locking-levers of the gun.

The single bolt-thrower H, precisely like those used in the gun mechanism, is pivoted on the pivot-pin E on the opposite side of the hammer I from the locking-lever F, and has its arm H' projecting down into the slot or opening $k^6$ in the pusher K. This pusher, like one fork-arm of that already described, has besides this slot the two cams $k'$ and $k^2$ for engaging the cam-lugs $f$ and $f'$ on the thrower-lever, the lower plane surface, $k^3$, connecting these two cams and the forward and rear elevated plane surface, $k^4$ and $k^5$, extending, respectively, forward from the upper end of cam $k'$ and rearward from the top of cam $k^2$. The manner in which these cams and surfaces act upon the cam-lugs on the locking-levers is fully set forth hereinbefore and need not be described now.

In my pistol, as shown in Fig. 10, the mainspring $I^2$ is not shown as applied directly to the hammer, as in my gun mechanism, and in the pistol shown in Fig. 13. Instead the mainspring is used to actuate the pusher and the hammer is moved by the latter.

A tongue $i^3$ on the hammer-cam engages a recess $k^8$ in the forward portion of the pusher. Extending rearward from this recess is a depression $k^9$ having a plane straight bottom $k^{10}$ running parallel with the line of movement of the pusher.

The receiver A of the pistol has a tang $A^2$ running down within the stock D and pivoted thereto at $d$. The rear side of this movable stock is continued upward within the receiver, and is forked, as shown in Fig. 11, to embrace the rear end of the tang $K'$ on pusher K. A pin $d'$ passes through the forked arms of the upper end of the stock and a hole $d^2$ in the pusher-tang end. Such hole is slightly elongated vertically, so as to allow enough play to permit the proper swing of the stock on its pivotal connection with the lower end of the receiver-tang. The mainspring $I^2$ is in this case preferably of the V shape and engages the rear side of the tang $A^2$ and the inner side of the rear wall of the stock D. The upper portion of the stock is thus normally held swung rearward and the connected pusher is retained in its rear position; or, to put it otherwise, the pistol and the breech mechanism are normally held swung forward and downward with reference to the stock and the breech mechanism is held forward with reference to the pusher. A trigger $I'$ is provided, adapted to engage with its nose the notch $l$ in the pusher when the latter has been moved forward to open the breech mechanism and has traveled rearward again far enough to cause the locking-lever $F'$ to rise and lock the bolt; or, to express it differently, the trigger engages the notch when the breech mechanism has moved rearward with reference to the pusher and has traveled forward again to a point where the breech-bolt is locked. If now, with the stock or handle D held in the hand, the trigger be pulled, the pistol, with the breech mechanism, will fly forward and downward, and the hammer will, by the contact of the short arm $i^3$ on the hammer-cam with the forward side of recess $k^8$, be swung quickly forward to deliver a firing blow on the firing pin or bolt. (Not shown.) Upon firing the pistol the recoil thereof will throw it rearward and upward again. Such movement, carrying the breech mechanism rearward with relation to the pusher, besides unlocking the bolt and throwing it back, swings the hammer quickly back by the engagement of the rear side of recess $k^8$ with arm $i^3$.

When the hammer has been thus fully retracted, so as to let the bolt B pass back over it, the arm $i^3$ passes out of recess $k^8$ and slides back over the plane surface $k^{10}$ without further swinging of the hammer.

If the pistol be provided with a magazine and suitable feed mechanism to feed the cartridges in front of the bolt, when the pistol flies up and the trigger $I'$ be held out of engagement with the pusher, the pistol will continue to fire and load automatically and rapidly until the cartridges are exhausted. If the trigger be let go, it will engage the notch in the pusher when the pistol thrown up by the recoil falls forward, and the pistol can then be fired, when desired, by simply pulling the trigger.

In the form of pistol shown in Figs. 13 and 14 of the drawings the pusher is actuated by a supplemental trigger or lever, and not by the recoil. Said pusher is guided like those already shown and described, and has cams upon it for actuating the bolt-locking lever and the thrower in precisely the same way as such devices are actuated by the cams on the pusher shown in Fig. 10. In this case, however, the pusher is forked to embrace the hammer-cam, as in the gun mechanism, and the opposite fork-arms are provided with the cams for actuating, respectively, the bolt-locking and bolt-throwing levers.

For retracting or cocking the hammer as the pusher is moved forward in the receiver, one arm of the pusher is provided with the depression $k^{11}$, which receives a shoulder $i^2$ on the side of the hammer-cam. The rear side of this depression engaging the rear side of the shoulder swings the hammer back as the pusher moves forward until the shoulder swings up and rides on the top of the pusher-fork arm. Movement of the pusher can then be continued without further movement of the hammer, which is held cammed back until the pusher moves back again to its rearward position.

The trigger $I'$ engages the safety and full-cock notches in the hammer-cam in the usual way, and an arm of the mainspring acts directly on the hammer. Another arm of the spring engages a lug $k^{12}$ on the pusher, so as to normally force the latter rearward into the position shown in Fig. 13.

For moving the pusher forward to open the breech and cock the hammer I provide the forked trigger or lever O, having the slot $o$ in each of its fork-arms engaging a pin $O'$ on the pusher. I do not limit myself to this construction of lever or its peculiar connection with the pusher. Other means can be used for reciprocating the latter without departure from my invention.

In operation, when it is desired to load the pistol as a single-loader, the trigger O is pulled to force the pusher forward. The latter, through the mechanism described and shown, unlocks breech-bolt B, cocks the hammer and throws the bolt back. A cartridge having been put in place to be pushed into the barrel, the trigger O is released and the pusher is thrown rearward by spring I² so as to throw the breech-bolt forward and lock the same. The hammer is retained in cocked position by the trigger I', and the pistol is ready for firing.

I contemplate providing this form of pistol also with a magazine and means for feeding the cartridges therefrom into the space in front of the breech-bolt when the latter is retracted, so that rapid firing can be kept up by pulling triggers O and I' alternately.

Either form of pistol shown and described provided with a suitable magazine furnishes a most convenient as well as efficient weapon for cavalry use whether single firing or rapid continuous firing is desired, as only one hand is needed at any time in firing and loading the piece.

In neither form of pistol does the hand gripping the stock have to be moved or changed in position whether the piece is being fired slowly and discontinuously or rapidly.

A carbine made in the same way as my gun can also be used by cavalry with great advantage, as only one hand is needed to handle it and there is no lever or arm to be operated by the other hand.

Having thus described my invention, what I claim is—

1. In combination with the breech-block of a firearm, a lock for the block a lever connected with the lock pivoted on a support independent of the block and provided with the two cam-lugs, and a movable piece provided with double cams to engage the lugs, substantially as and for the purpose set forth.

2. In combination with the breech-block of a firearm the locking-lever provided with the two lugs or projections, the reciprocating piece provided with the two cams to alternately engage the lugs as the piece is reciprocated, and having the plane surface between the cams, and the two plane surfaces extending from the tops of the cams, substantially as and for the purpose described.

3. In a breech mechanism for firearms in combination with the breech bolt or block and the lock for the same, the block-operating lever having on opposite sides of its pivot lugs or projections, a reciprocating cam-piece having the two opposite cams, the plane surface connecting the lower ends of the cams, and raised plane surfaces extending out from the upper ends of the cams, substantially as and for the purpose specified.

4. In a breech mechanism for firearms, in combination with the breech block or bolt and a lock therefor, the locking-lever having the two lugs below and on opposite sides of its pivot and the pusher provided with the two cams adapted to engage the lugs alternately as the pusher is reciprocated, and having the lower plane surface connecting the two cams, and the two elevated plane surfaces extending in opposite directions from the tops of the opposite cams, substantially as and for the purpose shown.

5. In combination with the breech block or bolt provided on opposite sides with abutments to engage locking-blocks, the two blocks, the levers connected therewith having each the two cam-lugs, the reciprocating pusher provided with the two sets of double cams and surfaces to engage the lugs on the levers and suitable recoil-surfaces engaging the rear sides of the locking-blocks when they are up in locking position, substantially as and for the purpose set forth.

6. In combination with the breech-bolt and the abutments or shoulders on each side thereof to engage the bolt-locks, the recoil-surfaces to be engaged by the locks, the two levers carrying the bolt-locks adapted to be passed up between the recoil-surfaces and the shoulders on the bolt, a movable piece or pusher and connecting means between the same and the levers whereby said levers are swung together up and down, to lock and unlock the bolt by reciprocation of the pusher, substantially as and for the purpose described.

7. In combination with the breech-bolt locking-lever having the two lugs on opposite sides of its pivot, the pusher provided with the forward and rear raised surfaces adapted to ride under and support the forward and rear lugs on the lever as the pusher is moved to the rear and front, respectively, the two oppositely-inclined cams leading to such surfaces and the lower plane surface between the cams parallel to the raised plane surfaces, substantially as and for the purpose specified.

8. In a breech mechanism for firearms, in combination with the breech-bolt, a lever fulcrumed on a bearing independent of the bolt and engaging a portion of the latter so as to reciprocate it as the lever swings, and a sliding piece or pusher connected with the lever so as to swing the same, substantially as and for the purpose shown.

9. In a breech mechanism for firearms, in combination with the breech-bolt, the thrower-lever connected with the bolt and having the shoulder $h$, the abutment on the frame adapted to be engaged by this shoulder, and means for moving the lever to bring the shoulder against the abutment and swing the lever about the point of engagement of the shoulder and abutment, substantially as and for the purpose set forth.

10. In combination with the pivot-pin and the thrower-lever provided with the slot engaging the pivot-pin, and with the shoulder, the fixed abutment to be engaged by the shoulder and the breech-bolt provided with suitable bearing-surfaces engaged by the lever for retracting the bolt, substantially as and for the purpose described.

11. In combination with the pivot-pin, the breech-bolt and the bolt-thrower lever, provided with the slot engaging the pin, an arm on its lower end, and a shoulder near its upper end, the breech-bolt provided with lugs or bearings engaged by the upper end of the lever, a movable piece engaging the arm on the lever and an abutment on the frame to be engaged by the shoulder on the lever for starting the bolt back, substantially as and for the purpose specified.

12. In combination with the breech-bolt of a breech mechanism for firearms, a thrower-lever for reciprocating the bolt and a fixed abutment forming a fulcrum to be engaged by the lever to enable it to pry the bolt back at the beginning of its movement and means for throwing the lever quickly backward after such prying action, substantially as and for the purpose shown.

13. In combination with the breech-bolt and the pivot-pin, the thrower-lever connected with the bolt at its upper end and having a forward inclination when the bolt is closed, the lever being provided with a slot engaging and extending rearward from the pivot-pin, with a shoulder near its upper end, and with an arm on its lower end, the fixed abutment to be engaged by the shoulder, and a reciprocating piece provided with a socket or recess to engage said arm, substantially as and for the purpose set forth.

14. In combination with the breech-bolt and the pivot-pin, the two bolt-throwing levers each having a slot to engage the pin, an arm on its lower end, and a shoulder near its upper end, bearings on the bolt engaged by the levers a fixed abutment for engagement with the shoulders on the levers, and the pusher having openings or recesses to engage the arms on the levers, substantially as and for the purpose described.

15. In combination with the breech-bolt provided with the two opposite bearing-surfaces with a passage between them, the pivot-pin, the lever projecting up into such passage and having the slot in its lower portion engaging the pin and extending rearward therefrom when the lever is swung forward, and the pusher having a recess adapted to engage an arm on the lower end of the lever, substantially as and for the purpose specified.

16. In combination with the breech-bolt, the hammer and the bolt-locking mechanism, the pusher for actuating such mechanism and engaging-cams on the pusher and hammer to retract the hammer when the bolt is unlocked, substantially as and for the purpose set forth.

17. In combination with the breech-bolt and the locking mechanism therefor, the pusher connected with such mechanism, so as to operate the same as it is moved, and provided with a cam, the hammer, and a shoulder thereon engaged by the cam on the pusher, substantially as and for the purpose described.

18. In combination with the bolt-locking lever, the reciprocating pusher provided with cam devices to actuate the lever to lock and unlock the bolt as the pusher is reciprocated, the hammer and a cam on the pusher engaging a shoulder on the hammer so as to cam back the latter, substantially as and for the purpose specified.

19. In a breech-loading firearm, in combination with the breech-block, a reciprocating piece having on it the two oppositely-inclined cams with a plane surface between them, and plane surfaces extending in opposite directions from them and the breech-block locking-lever having the two projections or lugs on opposite sides of its pivot to engage the cams and surfaces on the reciprocating piece, the relative arrangement of these lugs and the cams being such that only the central portion of the movement of the piece causes movement of the lever, and the latter is locked in position during the beginning and end of the movement of the piece, substantially as and for the purpose shown.

20. In a breech-loading firearm in combination with the breech-bolt and the locking mechanism therefor, a bolt-throwing lever, a reciprocating pusher and cam devices on the latter to engage the thrower, and the locking mechanism whereby, upon movement of the pusher, the bolt is first unlocked and then the thrower is actuated to throw the bolt open, substantially as and for the purpose specified.

21. In a breech-loading firearm, in combination with the breech-bolt, the reciprocating pusher having the two opposite cams $k'$ $k^2$, the surface $k^3$, connecting the cams and the two surfaces $k^4$ $k^5$ extending in opposite directions from the cams, the locking-lever provided with the cam-lugs on opposite sides of its pivot and the bolt-throwing lever actuated by the pusher to throw the bolt open and shut as the pusher reciprocates with relation to the breech mechanism, substantially as and for the purpose described.

22. In combination with the breech-bolt and the bolt-locking lever having the two lugs on opposite sides of its pivot, the pusher having the surfaces $k^4$ $k^5$, the opposite cams $k'$ $k^2$ joined to such surfaces, the surface $k^3$ between the cams, the thrower-lever having the shoulder $h$, the slot H' and the arm H² engaging a recess in the pusher, the fixed abutment $a^2$ and the pivot-pin E, substantially as and for the purpose specified.

23. In a breech-loading firearm, in combination with the breech-bolt, the locking device therefor, a lever to throw the bolt, and the hammer, a single reciprocating pusher provided with cams which engage co-operating parts on the locking-device, the bolt-thrower lever and the hammer for properly actuating the locking device and thrower-lever and throwing back the hammer as the pusher is moved with reference to the breech mechanism, substantially as and for the purpose shown.

24. In combination with the two corresponding locking-levers, the two bolt-throwing levers and the hammer provided on opposite sides of its cam with corresponding shoulders, the forked pusher having on its two fork-arms cams for actuating the locking-levers together, shoulders or cams for moving correspondingly the two bolt-throwing levers, and with cams to engage the shoulders on the hammer-cam, substantially as and for the purpose set forth.

25. In combination with the hammer having the corresponding shoulders on opposite sides of its cam, the two bolt-locking levers and the two bolt-throwing levers, the forked pusher having on its two forked arms similar cams and surfaces to actuate the bolt-locking levers together and lock them in corresponding positions, engaging-shoulders for actuating the bolt-throwing levers after the bolt is unlocked, and cams to engage the shoulders on the hammer-cam, substantially as and for the purpose described.

26. In combination with the hammer having a shoulder on its cam, and the mainspring, the pusher having a cam engaging the shoulder on the hammer-cam, so as to cock the hammer on the forward movement of the pusher, the swinging butt-plate hinged to the stock, and connecting means between this plate and the pusher, whereby the pusher and plate are caused to move together, substantially as and for the purpose specified.

27. In combination with a hammer provided with a full-cock notch and a shoulder on its cam, the pusher provided with a shoulder adapted to engage the shoulder on the hammer-cam, so as to cock the hammer as the pusher is moved forward with reference to the hammer, the movable butt-plate connected with the pusher, the spring engaging the plate, and the main or hammer spring, substantially as and for the purpose shown.

28. In a breech-loading firearm, in combination with the breech mechanism and the pusher for operating the same, a piece connected with the pusher and made movable with reference to the breech mechanism carrying part of the gun, whereby the pusher can be held against backward movement while such part is allowed to move rearward, substantially as and for the purpose specified.

29. In a breech-loading firearm, in combination with the breech mechanism, the pusher, means substantially as described for holding the latter against rearward movement while allowing the piece to be moved by the recoil of firing, and connecting means substantially as described between the breech mechanism and pusher whereby the breech mechanism is held locked during the first rearward motion of the piece, and then is unlocked and opened, substantially as and for the purpose shown.

30. In a breech-loading firearm, in combination with the breech-bolt and the breech-bolt lock and the lever for operating the same, having a cam-lug, the pusher connected with means substantially as described for holding it stationary while allowing the gun to move rearward under the recoil of firing and the surface on the pusher engaging the lug on the bolt-locking lever and holding the lever in locking position during the first portion of the recoil movement of the gun, substantially as and for the purpose set forth.

31. In a breech-loading firearm, in combination with the locking-lever for the breech-bolt, having lugs on its pivotal portion, in front and rear of its pivot, the pusher having the two opposite cams for engaging the lugs, and the forward elevated surface adapted to engage the forward lug and hold the lever up in locking position, and means for holding the pusher against rearward movement while allowing the piece to have such movement, substantially as and for the purpose described.

32. In combination with the pusher and tang thereof, the lug on the tang and a lock to engage the lug and hold the pusher in its rearward position, said lock being constructed to be unaffected by the movement of the gun, substantially as and for the purpose specified.

33. In combination with the breech-mechanism-operating pusher and its tang, the lug on the latter, the reciprocating slotted piece embracing the tang, and the spring throwing the piece into position to engage the lug, substantially as and for the purpose shown.

34. In a breech-loading firearm, in combination with the pusher for actuating the breech mechanism, the lock therefor to lock it from moving forward situated in the grip of the stock in position to be engaged and moved to unlock the pusher by the hand grasping the stock, as in the act of firing, substantially as and for the purpose set forth.

In testimony that I claim the foregoing I have hereunto set my hand this 27th day of July, A. D. 1887.

WM. W. KIMBALL.

Witnesses:
HENRY C. HAZARD,
GEO. S. PRINDLE.